US012571378B2

(12) United States Patent
Kato et al.

(10) Patent No.: US 12,571,378 B2
(45) Date of Patent: Mar. 10, 2026

(54) GEOTHERMAL POWER GENERATION SYSTEM AND SILICA SCALE DEPOSITION CONTROL METHOD

(71) Applicant: FUJI ELECTRIC CO., LTD., Kawasaki (JP)

(72) Inventors: Taichiro Kato, Tokyo (JP); Shinya Ui, Tokyo (JP); Azusa Ozawa, Tokyo (JP); Tianlong Jiang, Tokyo (JP); Fumi Ui, Tokyo (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 18/820,478

(22) Filed: Aug. 30, 2024

(65) Prior Publication Data

US 2024/0426283 A1 Dec. 26, 2024

Related U.S. Application Data

(63) Continuation of application No. PCT/JP2023/031960, filed on Aug. 31, 2023.

(30) Foreign Application Priority Data

Sep. 29, 2022 (JP) ................................. 2022-156629

(51) Int. Cl.
*F03G 4/00* (2006.01)
*C02F 1/00* (2023.01)
(Continued)

(52) U.S. Cl.
CPC ............. *F03G 4/069* (2021.08); *C02F 1/008* (2013.01); *C02F 1/66* (2013.01); *C02F 5/00* (2013.01);
(Continued)

(58) Field of Classification Search
CPC . F03G 4/069; F03G 4/00; F03G 4/033; F03G 4/072; C02F 1/008; C02F 1/66;
(Continued)

(56) References Cited

U.S. PATENT DOCUMENTS

2011/0239649 A1* 10/2011 Myougan ................ F03G 4/074
60/641.2
2014/0083949 A1 3/2014 Takahashi et al.
(Continued)

FOREIGN PATENT DOCUMENTS

CN 113620478 A 11/2021
JP 2011-196197 A 10/2011
(Continued)

OTHER PUBLICATIONS

International Search Report issued in International Application No. PCT/JP2023/031960 dated Nov. 14, 2023.
(Continued)

*Primary Examiner* — Audrey B. Walter

(57) ABSTRACT

A geothermal power generation system to control deposition of silica scale may include a steam separator that separates a geothermal fluid from a production well, into steam and hot water, such that the geothermal fluid passing through the steam separator and/or a turbine rotated by the steam is returned to a reinjection well. A pH measurement system measures a pH of the hot water. A first thermometer measures a temperature of the hot water. An injection device injects an alkaline chemical into the geothermal fluid. A second thermometer measures a temperature of the geothermal fluid at a pH estimation point selected from an injection portion for the alkaline chemical, an outlet of the steam separator, and an inlet of the reinjection well. A control device controls injection of the alkaline chemical based on
(Continued)

measurement results of the pH measurement system, the first thermometer, and the second thermometer.

12 Claims, 5 Drawing Sheets

(51) Int. Cl.
| | | |
|---|---|---|
| *C02F 1/66* | (2023.01) | |
| *C02F 5/00* | (2023.01) | |
| *C02F 103/10* | (2006.01) | |

(52) U.S. Cl.
CPC ............... *F03G 4/00* (2021.08); *F03G 4/033* (2021.08); *F03G 4/072* (2021.08); *C02F 2103/10* (2013.01); *C02F 2209/02* (2013.01); *C02F 2209/06* (2013.01); *C02F 2303/22* (2013.01); *Y02E 10/10* (2013.01)

(58) Field of Classification Search
CPC .... C02F 5/00; C02F 2103/10; C02F 2209/02; C02F 2209/06; C02F 2303/22; Y02E 10/10

See application file for complete search history.

(56) References Cited

U.S. PATENT DOCUMENTS

| | | |
|---|---|---|
| 2014/0165564 A1 | 6/2014 | Inoue et al. |
| 2024/0027328 A1 | 1/2024 | Jiang et al. |

FOREIGN PATENT DOCUMENTS

| | | |
|---|---|---|
| JP | 2013-043145 A | 3/2013 |
| JP | 2015-090147 A | 5/2015 |
| JP | 2018-167204 A | 11/2018 |
| WO | 2012/144277 A1 | 10/2012 |
| WO | 2013/027822 A1 | 2/2013 |
| WO | 2023/074697 A1 | 5/2023 |

OTHER PUBLICATIONS

Written Opinion issued in International Application No. PCT/JP2023/031960 dated Nov. 14, 2023.

* cited by examiner

FIG. 1

GEOTHERMAL POWER GENERATION SYSTEM AND SILICA SCALE DEPOSITION CONTROL METHOD

CROSS-REFERENCE TO RELATED APPLICATIONS

This application is a continuation application of PCT/JP2023/031960, filed on Aug. 31, 2023, which claims priority to Japanese Patent Application No. 2022-156629, filed on Sep. 29, 2022, the contents of all of which are incorporated herein by reference.

TECHNICAL FIELD

The present invention relates to a geothermal power generation system and to a silica scale deposition control method.

BACKGROUND ART

Conventionally, scale deposition has been a problem in systems including fluid flow systems, such as power generation plants, ship systems, boiler systems, and steel plants. In particular, in a system that uses a geothermal fluid as in a geothermal power generation plant or the like, deposition of silica scale is a problem. In order to suppress the deposition of the silica scale, such attempts have been made to control pH of the geothermal fluid.

A geothermal power generation system is known that supplies an oxidizing chemical into separated hot water in a hot water return line which returns the separated hot water separated by a steam separator to a hot water reinjection well, thereby generating sulfuric acid in geothermal hot water, from hydrosulfide ($H_2S$) in the separated hot water (for example, refer to Patent Document 1). In Patent Document 1, it is disclosed that the adhesion of scale with a silica component in a hot water system can be prevented by the separated hot water being set to be acidic.

A scale suppressing method is known which includes: a step of adding a scale suppression chemical to geothermal water collected from a production well; and a step of adjusting the pH to 9 or higher by addition of an alkaline chemical simultaneously with or after the addition of the scale suppression chemical (for example, refer to Patent Document 2). A method in Patent Document 2 increases a pH of the geothermal water, thereby suppressing the formation of silica scale, and can also prevent deposition of salt due to an inorganic cation in the addition of the alkaline chemical.

A scale suppressing method is known which includes a step of supplying a chelating chemical and an alkaline chemical into a pipe through which a fluid flows, in order to suppress scale containing calcium and silica (for example, refer to Patent Document 3). Patent Document 3 provides a method which can suppress the amount of chelating chemical to be used to the minimum necessary, while still suppressing the deposition of scale.

REFERENCE DOCUMENT LIST

Patent Documents

Patent Document 1: JP 2015-90147 A
Patent Document 2: International Publication WO 2012/144277
Patent Document 3: JP 2013-43145 A

SUMMARY OF THE INVENTION

Problem to be Solved by the Invention

Among plants in which scale causes a problem, a geothermal power generation system has a high concentration of dissolved silica in geothermal water which flows in the inside. For example, a concentration of dissolved silica in cooling water is about 150 ppm at maximum, but in contrast to this, the concentration of dissolved silica in geothermal water in Japan may reach 450 to 900 ppm. This has led to the problem that scale, such as amorphous silica, tends to be easily deposited. At present, because of the deposition of silica scale, it is necessary to periodically perform maintenance on a turbine unit, a steam separator, a heat exchanger and the like.

The method disclosed in Patent Document 1 discloses a method of controlling the geothermal water to be acidic, but it is difficult to thereby control the pH of the geothermal water, because the range of variation is large around the target acidic pH of 5 to 5.5. There has been a problem in that if the pH of the geothermal water is less than 5, a problem of pipe corrosion is substantial, and if the pH exceeds 5.5, there is little effect on scale prevention.

In addition, in Patent Document 1, the amount of oxidizing chemical to be injected is controlled by measurement of a pH with a pH meter after the oxidizing chemical has been injected. However, because there is no method to prevent scale from adhering to the pH meter itself, and accordingly, there has been a problem in that the pH cannot be measured accurately over time.

In the methods disclosed in Patent Documents 2 and 3, the geothermal water is controlled to be in an alkaline range, and accordingly, the problem of pipe corrosion is unlikely to occur because the pH changes slowly even when the oxidizing chemical has been added. However, there has been a problem in that scale adheres to the pH meter, and the accuracy of pH measurement cannot be secured. In addition, in the method disclosed in Patent Document 2 or 3, there has also been a problem in that the addition of the scale suppression chemical and the chelating chemical is expensive.

In geothermal power generation systems, an effective and economical pH control method for geothermal fluid is required for preventing adhesion of scale, which originates in the geothermal fluid.

Means for Solving the Problem

The present inventors have found a method that prevents adhesion of scale onto a pH meter, accurately measures a pH of geothermal fluid, and controls the pH of geothermal fluid to a value within a specific alkaline range, and they have thereby completed the present invention.

To be specific, an embodiment of the present invention includes the following.

[1] A geothermal power generation system including:

a production well;

a steam separator that separates a geothermal fluid which is obtained from the production well, into steam and hot water;

a turbine that is rotated by the steam separated by a steam separator;

a reinjection well to which the geothermal fluid that has passed through the steam separator and/or the turbine is returned;

a pH measurement system that extracts a part of the hot water separated by the steam separator and measures the pH of the hot water, and a first thermometer that measures the temperature of the hot water;

an injection device that injects an alkaline chemical into the geothermal fluid;

a second thermometer that measures a temperature of the geothermal fluid at a pH estimation point which is selected from the group consisting of an injection portion for the alkaline chemical, an outlet of the steam separator, and an inlet of the reinjection well; and a control device that controls the injection of the alkaline chemical by the injection device, on the basis of measurement results of the pH measurement system, the first thermometer and the second thermometer, wherein the pH measurement system includes a spiral pipe and a pH meter, and is connected to a condensate pump downstream of the turbine via an on-off valve.

[2] The system according to [1], wherein the pH measurement system further includes an injection portion for cleaning chemicals.

[3] The system according to [1], wherein the injection device is connected to a pipe between the production well and the steam separator.

[4] The system according to [3], wherein the second thermometer is provided in the pipe between the production well and the steam separator.

[5] The system according to [3], wherein the second thermometer is provided at the inlet of the reinjection well.

[6] The system according to [1], wherein the injection device is connected to a hot water portion of the steam separator.

[7] A silica scale deposition control method including:

(a) measuring a temperature of a geothermal fluid at a pH estimation point of a geothermal power generation system;

(b) extracting a part of hot water separated by a steam separator, dissipating heat of the hot water, and measuring the pH and temperature thereof;

(c) estimating the pH of the geothermal fluid at the pH estimation point, on the basis of the measurement results of the steps (a) and (b); and (d) determining whether or not an alkaline chemical needs to be injected into the geothermal fluid, on the basis of the estimation result of the step (c).

[8] The method according to [7], wherein, in the step (d), in a case in which the pH is lower than a predetermined range in an alkaline range, it is determined that the alkaline chemical needs to be injected into the geothermal fluid.

[9] The method according to [7], further including:

(e) determining an amount of the alkaline chemical to be injected, in a case in which it is determined that the alkaline chemical needs to be injected, in the step (d);

(f) injecting the alkaline chemical into the geothermal fluid, on the basis of the determination result of the step (e);

(g) measuring the temperature of the geothermal fluid at the pH estimation point, after the step (f) has been completed:

(h) extracting a part of the hot water separated by the steam separator, after the step (f) has been completed, dissipating the heat in the hot water, and measuring the pH and the temperature;

(i) estimating the pH of the geothermal fluid at the pH estimation point, on the basis of the measurement results of the steps (g) and (h); and (j) determining whether the amount of the alkaline chemical to be injected into the geothermal fluid is increased, decreased, or maintained on the basis of the estimation result of the step (i).

[10] The method according to [9], wherein in the step (j): it is determined to increase an amount of the alkaline chemical to be injected, in a case in which the pH is lower than the predetermined range in the alkaline range; it is determined to decrease the amount of the alkaline chemical to be injected, in a case in which the pH exceeds the predetermined range in the alkaline range; and it is determined to maintain the amount of the alkaline chemical to be injected, in a case in which the pH is within the predetermined range in the alkaline range.

[11] The method according to [10], including:

in a case in which it is determined to increase the amount of the alkaline chemical to be injected, in the step (j), performing operations of increasing and estimating the pH, which include (k) determining an amount of the alkaline chemical to be injected after increase, (l) injecting the alkaline chemical into the geothermal fluid, on the basis of the determination result of the step (k), (m) measuring the temperature of the geothermal fluid at the pH estimation point, after the step (I) has been completed, (n) extracting a part of the hot water separated by the steam separator, dissipating heat of the hot water, and measuring the pH and temperature thereof, after the step (l) has been completed, and (o) estimating the pH of the geothermal fluid at the pH estimation point, on the basis of the measurement results of the steps (m) and (n); and in a case in which it is determined to decrease the amount of the alkaline chemical to be injected, in the step (j), performing operations of decreasing and estimating the pH, which include (p) determining the amount of the alkaline chemical to be injected after decrease, (q) injecting the alkaline chemical into the geothermal fluid, on the basis of the determination result of the step (p), (r) measuring the temperature of the geothermal fluid at the pH estimation point, after the step (q) has been completed, (s) extracting a part of the hot water separated by the steam separator, dissipating heat of the hot water, and measuring the pH and the temperature thereof, after the step (q) has been completed, and (t) estimating the pH of the geothermal fluid at the pH estimation point, on the basis of the measurement results of the steps (r) and(s).

[12] The method according to [11], further including a step of determining whether the amount of the alkaline chemical to be injected into the geothermal fluid is increased, decreased, or maintained, on the basis of the estimation results of the step (o) or the step (t); and repeating the operations of increasing and estimating the pH or the operations of decreasing and estimating the pH, until the estimated pH value reaches a predetermined range in a predetermined alkaline range.

Effects of the Invention

According to the geothermal power generation system and the silica scale deposition control method of the present invention, it becomes possible to prevent scale from adhering to a pH meter, and to accurately measure the pH over a long period of time. In addition, thereby, a property of the geothermal fluid is maintained at a pH of about 8 to 9, and in a plant in which the deposition of silica scale is a problem, it is possible to extend a maintenance cycle and contribute to stable operation of the plant.

BRIEF DESCRIPTION OF THE DRAWINGS

FIG. 1 is a view conceptually showing a geothermal power generation system according to a first embodiment of the present invention.

MODE FOR CARRYING OUT THE INVENTION

Figure 2A:
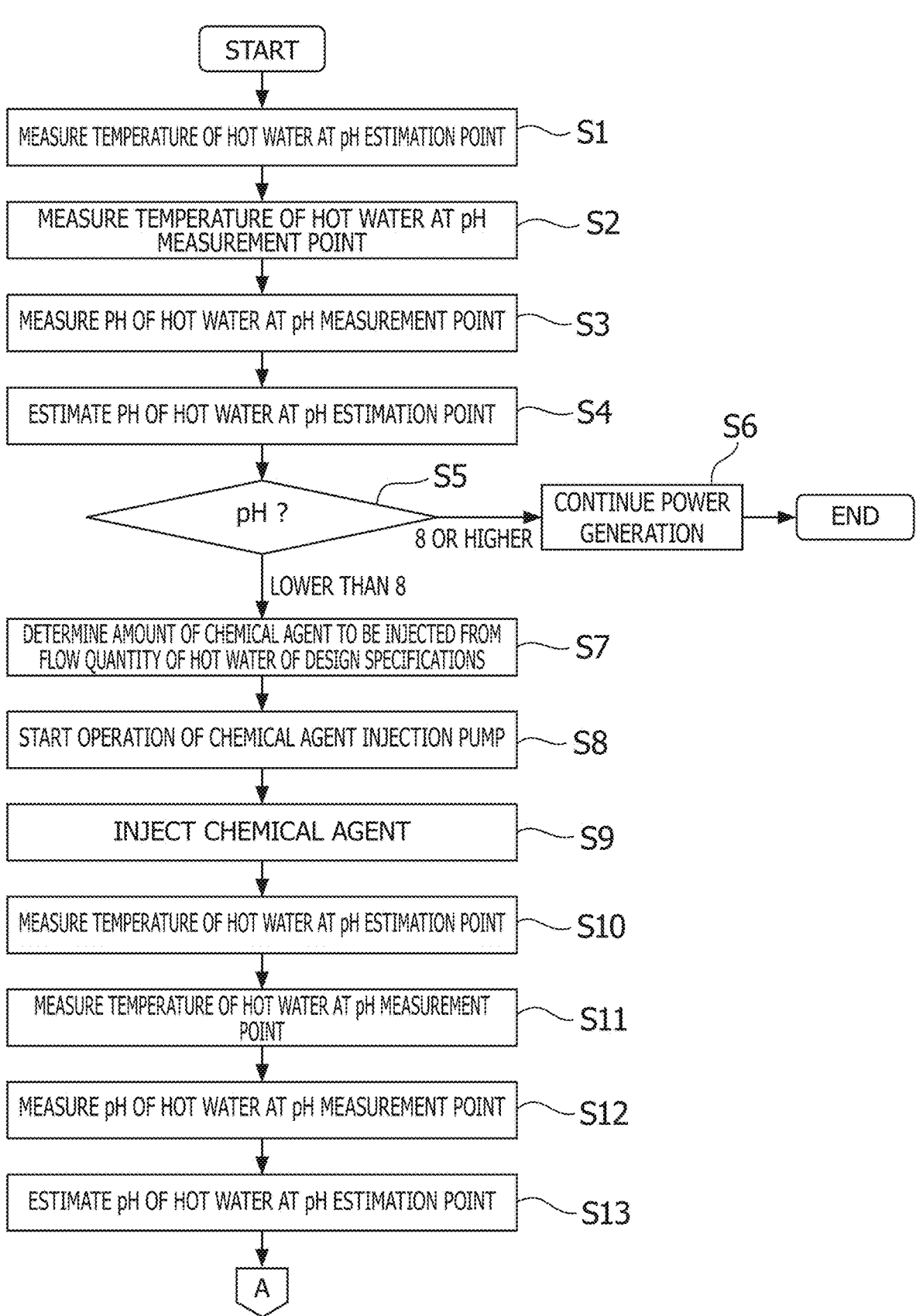
FIG. 2A is a flowchart describing a silica scale deposition control method according to one embodiment of the present invention.

Embodiments of the present invention will be described below with reference to the drawings. However, the present invention is not limited to the embodiments that are described below.

The present invention relates to a geothermal power generation system and a silica scale deposition control method, according to one embodiment.

Figure 1:
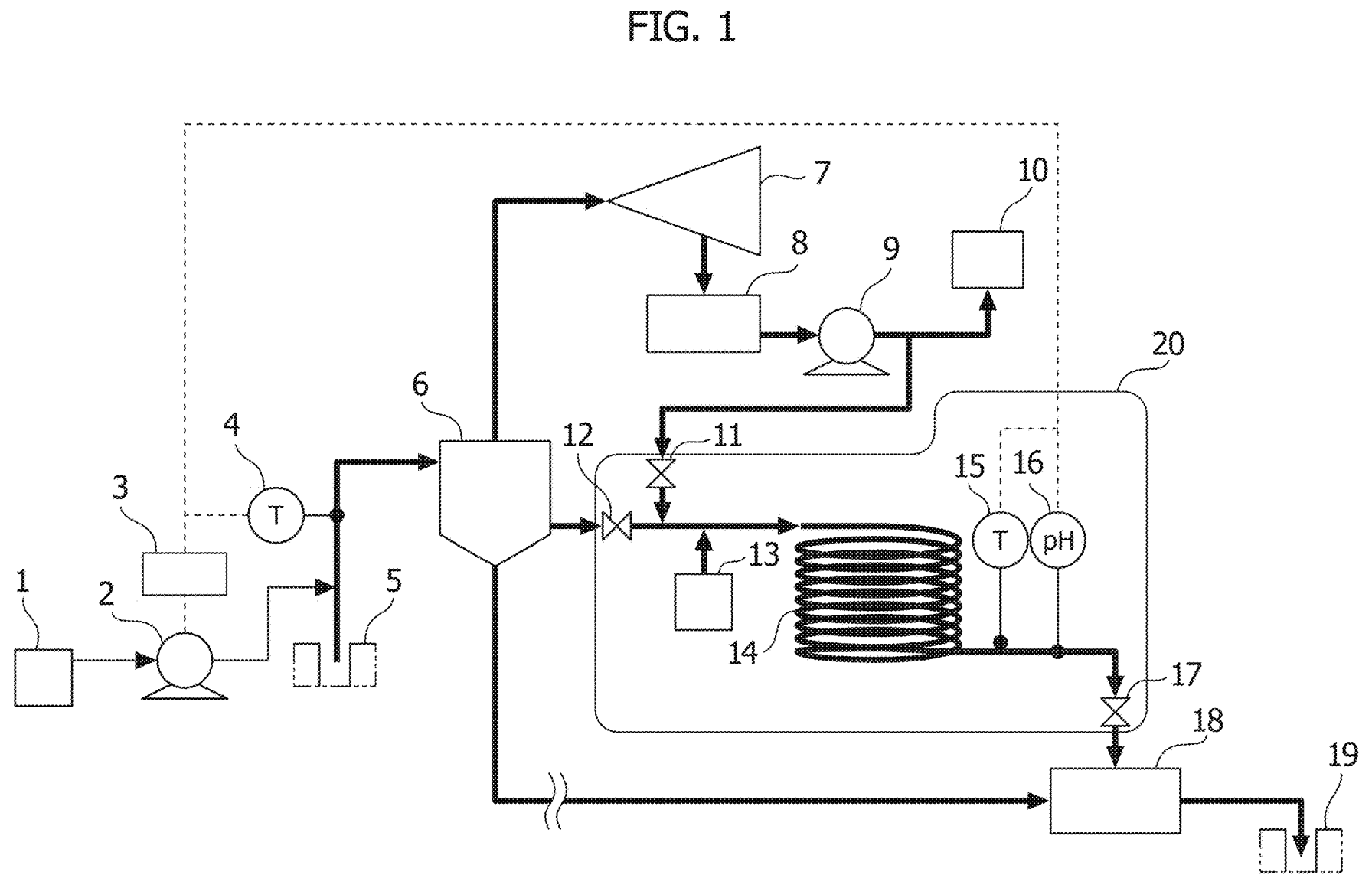

FIG. 1 is a view conceptually showing the geothermal power generation system according to a first embodiment. The geothermal power generation system shown in FIG. 1 is a system that generates electric power while using a geothermal fluid as a power source, and mainly includes a production well 5, a steam separator 6, a turbine 7, a condenser 8, a condensate pump 9, and a reinjection well 19. The geothermal power generation system further includes a chemical tank 1, a chemical injection pump 2 which is an example of a chemical injection device, a control device 3, a first thermometer 15, a second thermometer 4, and a pH measurement system 20, as a configuration for scale control. In the figure, thick solid arrows indicate flows of the geothermal fluid, and steam, hot water and condensate which are components derived from the geothermal fluid. Thin solid arrows indicate flow of the chemical. Dashed lines indicate signals concerning the control.

The flow of the geothermal fluid in the geothermal power generation system will be described below. The production well 5 is a well for leading the geothermal fluid that is hot water, steam, or a mixture thereof, which exists in a geothermal reservoir in the ground to above-ground. The geothermal fluid led out from the production well 5 is separated into steam as a gas component and hot water as a liquid component, by the steam separator 6. The separated steam is led to the turbine 7 and is used to rotate the turbine, and thereby produces electricity in an electric power generator. The steam that has worked in the turbine 7 is cooled and condensed into condensate in the condenser 8. The condensate is sent to a cooling tower 10 by the condensate pump 9. On the other hand, the hot water separated by the steam separator 6 is optionally led to a hot water pit 18 via a heat exchanger, not shown, or the like, and is returned to the reinjection well 19. In some cases, a part of the hot water led to the hot water pit 18 is led to a facility, not shown, which utilizes heat of the water at the downstream, such as a hot spring facility.

In the case of a binary power generation system, a second steam separator is provided at a stage subsequent to the steam separator 6, and the steam separated by the second steam separator heats a medium having a low boiling point. The heated medium having the low boiling point is used for the rotation of a second turbine. In some cases, the medium having the low boiling point is used while being circulated and being repeatedly evaporated and condensed, and the hot water separated by the steam separator 6 is used for heating the medium having the low boiling point. In the present invention, details of the power generation which operates the second turbine by the medium having the low boiling point are not shown. The geothermal power generation system according to the present invention describes a configuration common to the binary power generation system and the system that operates the turbine only by the geothermal steam; and both of the binary power generation system and the system that operates the turbine only by the geothermal steam fall within the scope of the present invention.

Referring to FIG. 1, the pH measurement system 20 and the first thermometer 15 are connected to the steam separator 6. The system 20 for pH measurement is configured so that a part of the hot water component separated by the steam separator 6 can flow into the system. In more detail, the pH measurement system 20 is configured so that mainly a pipe branching from the steam separator 6, a spiral pipe 14, and a pH meter 16 are connected to the system, in this order. A pipe from the condensate pump 9 is connected to a pipe branching from the steam separator 6, and cleaning chemicals injection device 13 can be optionally connected to the pipe. The hot water can be retained inside the pH measurement system 20 by a first on-off valve 12 positioned between the steam separator 6 and the system 20, a second on-off valve 11 positioned between the condensate pump 9 and the system 20, and a third on-off valve 17 positioned at a subsequent stage of the pH meter 16. Due to such a configuration, it becomes possible to measure the pH of the hot water, in a state in which movement of substances is blocked for a certain period of time.

In the pH measurement system 20, the pipe through which the hot water flows can be mainly formed from metal, and is preferably one made from a corrosion-resistant metal such as a stainless-steel pipe. The pipe through which the hot water flows may have an outer diameter of about 2 to 12.7 mm, for example. Alternatively, it is preferable to use a relatively thin pipe having a diameter ratio of about 0.004 to 0.028 or less in terms of outer diameter ratio with respect to a transport pipe for sending the hot water from the steam separator 6 to the hot water pit 18, as the pipe through which the hot water flows. The spiral pipe 14 may be capable of securing a sufficient surface area for decreasing the temperature of the hot water which is separated from the steam separator 6 and has a high temperature of about 200° C., to about 80° C.; and the diameter and the number of turns of the spiral are not particularly limited. However, it is preferable to install the spiral pipe 14 in a form such that the outer surface thereof can come in contact with the atmosphere at room temperature. The pH meter 16 may be a device that is provided with a porous glass electrode which is commonly used, and can measure a pH in a range of about 5 to 11.

An operation of the pH measurement system 20 will be described below. In the case in which the pH of the hot water is measured, the first on-off valve 12 between the steam separator 6 and the system 20 is opened, and the hot water is introduced to the inside of the pH measurement system 20. The second on-off valve 11 is kept closed while the pH is measured. The hot water sent from the steam separator 6 passes through the spiral pipe 14 at a high speed, dissipates heat while passing through the spiral pipe 14, and reaches the pH meter 16. When the hot water is filled in the pH measurement system 20, the first on-off valve 12 and the third on-off valve 17 are closed. Thereby, the pH of the hot water is measured by the pH meter 16 in a state in which the hot water is retained in the inside of the pH measurement system 20. The temperature of the hot water may be obtained by the measurement of the temperature of the pipe near the pH meter 16, with the first thermometer 15. The first thermometer 15 may be a thermometer that measures the temperature by coming into contact with the pipe, or may be a thermometer that can measure the temperature of the pipe without contact. Alternatively, the first thermometer 15 may be a thermometer that directly measures the temperature of the hot water, instead of the temperature of the pipe.

The pH of the hot water obtained by the pH meter 16 and the temperature of the hot water obtained by the first thermometer 15 are sent to the control device 3. The pH of the hot water obtained by the pH meter 16 and the temperature of the hot water obtained by the first thermometer 15 are referred to as the pH and the temperature of the hot water obtained at the pH measurement point, in the present specification, in some cases.

After the pH and temperature of the hot water have been measured, the third on-off valve 17 is opened, and the hot water after the measurement is discharged from the inside of the pH measurement system 20 to the hot water pit 18. Next, the inside of the pH measurement system 20 can be cleaned. When the pH measurement system 20 is cleaned, the second on-off valve 11 is opened in a state in which the first on-off valve 12 is closed and the third on-off valve 17 is opened. From the pipe connected to the condensate pump 9, the condensate of which the temperature has been decreased to a normal temperature, flows into the pipe branching from the steam separator 6, at a high pressure. Thereby, the condensate having a relatively low content of scale at room temperature flows through the pipe in the inside of the pH measurement system 20, at a high speed. The speed of the condensate can be adjusted by the pressure of the condensate pump 9. The condensate flowing at a high speed can physically remove scale that has adhered to, or is growing on, the pipe during the pH measurement. In a case in which the adhesion of the scale is a concern, the cleaning chemicals injection device 13 can be configured to optionally inject cleaning chemicals for scale into the pipe of the pH measurement system 20. The cleaning chemicals can use hydrofluoric acid, sodium hydroxide or the like, but it is not limited to specific cleaning chemicals.

After the completion of the cleaning, valves 11, 12, and 17 can be closed in a state in which a liquid, such as a condensate, a cleaning liquid, or tap water is retained in the pipe of the pH measurement system 20, until the next use. In addition, at this time, it is preferable that a detection portion of the pH meter be configured to be storable in a KCl solution which is a solution of the reference electrode of the pH meter.

The second thermometer 4 measures a temperature of the geothermal fluid between the production well 5 and the steam separator 6. In more detail, the temperature of the geothermal fluid can be obtained by the measurement of the temperature of the pipe through which the geothermal fluid flows, between the production well 5 and the steam separator 6. The second thermometer 4 may have a similar structure to the first thermometer 15, and it is also possible to obtain the temperature of the geothermal fluid in other ways as described about the first thermometer 15. The temperature of the hot water obtained by the second thermometer 4 is sent to the control device 3. The temperature obtained by the second thermometer 4 is used for estimating the pH of the geothermal fluid at a site at which the second thermometer 4 is installed. In the present specification, the temperature obtained by the second thermometer 4 is referred to as the temperature obtained at the pH estimation point, in some cases.

The chemical tank 1 and the chemical injection pump 2 are connected in a manner that allows a chemical capable of adjusting the pH, typically an alkaline chemical, to be injected into the geothermal fluid flowing through the geothermal power generation system. In the first embodiment shown in FIG. 1, the chemical injection pump 2 is connected to a pipe between the production well 5 and the steam separator 6. The control device 3 is configured to be capable of controlling the start and stop of the injection of the chemical and the amount of the chemical injected.

The control device 3 is electrically connected to the pH meter 16, the first thermometer 15, and the second thermometer 4, and acquires the actually measured data therefrom, and also performs calculations for estimating the pH at the pH estimation point that is the site at which the second thermometer 4 is installed, on the basis of actually measured data. In addition, on the basis of these calculation results, the control device 3 can perform the calculation of start and stop of an operation of the chemical injection pump 2 and the injection amount, and give a command to the chemical injection pump 2. The control device 3 may be a computer in which an algorithm for these calculations is incorporated. Details of the calculation and the command will be described later.

Next, a silica scale deposition control method will be described that is used in the geothermal power generation system shown in FIG. 1. The silica scale deposition control method relates to a method that can estimate a value of the pH at a predetermined site in the geothermal power generation system and can control the injection of the chemical into the geothermal fluid so that the estimated value is maintained at 8 or higher and at 9 or lower.

In more detail, the silica scale deposition control method includes the following steps:

(a) measuring a temperature of a geothermal fluid at a pH estimation point of a geothermal power generation system;

(b) extracting some of the hot water separated by a steam separator, dissipating heat of the hot water, and measuring pH and temperature thereof;

(c) estimating the pH of the geothermal fluid at the pH estimation point, on the basis of the measurement results of the steps (a) and (b); and (d) determining whether or not an alkaline chemical needs to be injected into the geothermal fluid, on the basis of the estimation result of the step (c).

Figure 2B:
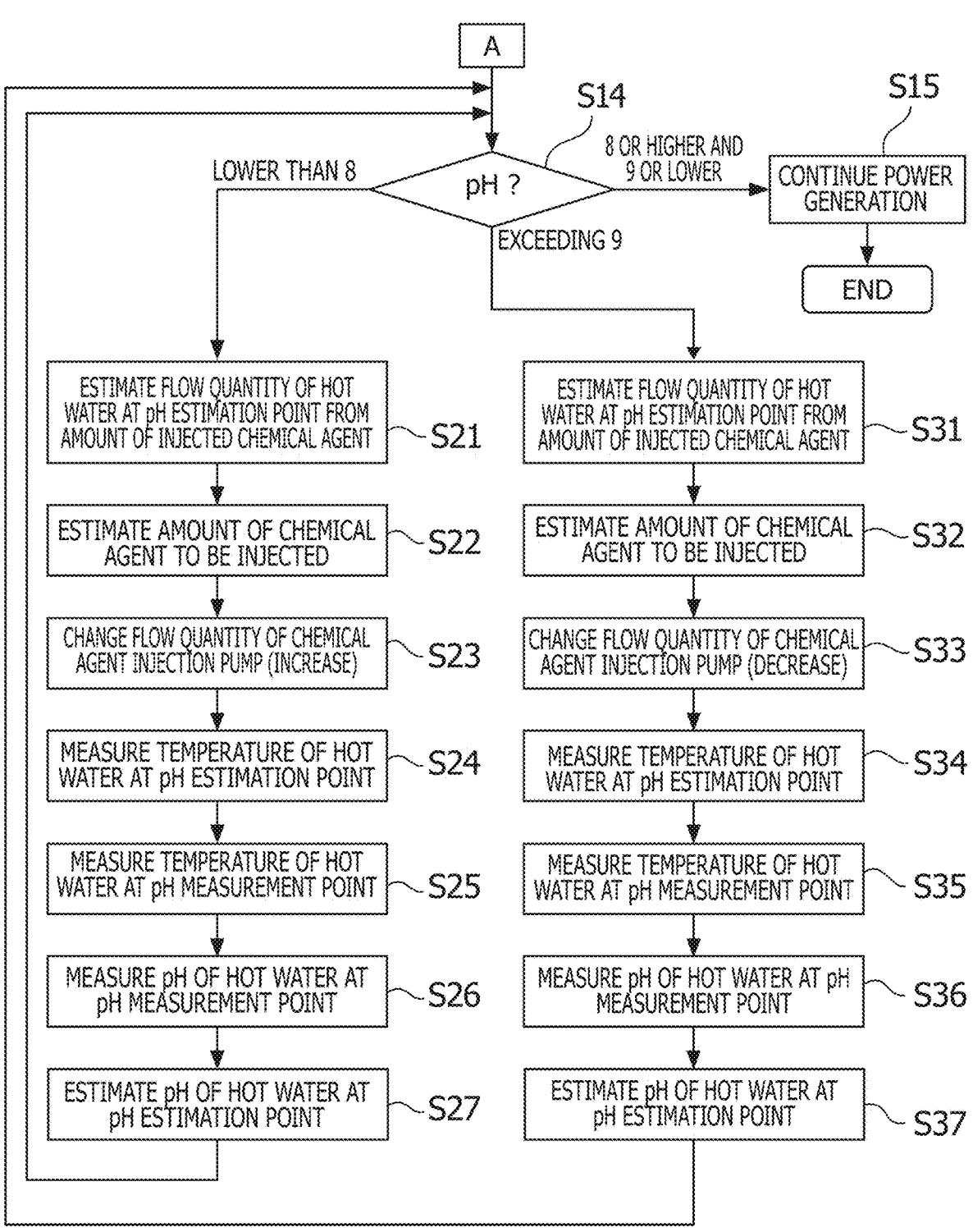
FIG. 2B is a flowchart describing the silica scale deposition control method according to one embodiment of the present invention, and is a figure describing the control subsequent to FIG. 2A.

FIG. 2A and FIG. 2B are flowcharts describing an example of the silica scale deposition control method. Hereinafter, the silica scale deposition control method will be described with reference to the conceptual view of the geothermal power generation system according to the first embodiment shown in FIG. 1 and the flowcharts. There are cases in which the geothermal fluid in the step (c) is a mixture of steam and hot water, or is hot water, depending on the position of the pH estimation point, and in the flowcharts, the geothermal fluid will be described as the hot water, as an example. Both cases are referred to as the geothermal fluid.

In the geothermal power generation system, the silica scale deposition control method is preferably performed periodically and can be performed, for example, once a month or once every two months. However, the frequency of the implementation can be increased or decreased as needed.

In the step (a), the temperature of the geothermal fluid is measured at the pH estimation point of the geothermal power generation system. In the first embodiment, the pH estimation point exists between the production well 5 and the steam separator 6, and the second thermometer 4 can measure the temperature of the pipe through which the geothermal fluid flows, at the pH estimation point. The step (a) corresponds to S1 in the flowchart of FIG. 2A.

In the step (b), a part of the hot water separated by the steam separator 6 is extracted, the heat is dissipated, and the pH and the temperature are measured. In the step (b), the pH measurement system 20 is operated, and it measures the pH of the hot water with the pH meter 16. In addition, the first thermometer 15 can measure the temperature of the pipe through which the hot water flows, and can measure the temperature of the hot water. The step (b) corresponds to S2 and S3 in the flowchart of FIG. 2A.

In the step (c), the pH of the geothermal fluid at the pH estimation point is estimated according to the measurement results of the steps (a) and (b). To be specific, the measured values obtained in the steps (a) and (b) are sent to the control device 3. In addition, the pH of the geothermal fluid at the pH estimation point can be estimated on the basis of an algorithm incorporated in the control device 3 in advance. The algorithm may be capable of calculating the pH of the geothermal fluid at the pH estimation point on the basis of a relational expression between temperature and pH. The relational expression between the temperature and the pH can be calculated with the use of commercially available software such as the Geochemist's Workbench (registered trademark), for example. The step (c) corresponds to S4 in the flowchart of FIG. 2A.

In the step (d), it is determined whether or not the alkaline chemical needs to be injected into the geothermal fluid, according to the estimation result of the step (c). To be more specific, it is determined whether or not the alkaline chemical needs to be injected into the geothermal fluid, depending on whether the estimated pH value is lower than the lower limit value of a predetermined alkaline range in which scale is less likely to form, or is the lower limit value or higher. The predetermined alkaline range in which scale is less likely to form is not particularly limited, but the range can be set within the pH range of 8 to 11 by one skilled in the art, and can be set to, for example, 8 or higher and 9 or lower. The flowchart and the following description will be described by taking a case in which the predetermined range of the alkaline range, in other words, a range of an appropriate estimated pH value is 8 or higher and 9 or lower, as an example. The step (d) corresponds to S5 in the flowchart of FIG. 2A. When the estimated pH value is 8 or higher, it is determined that the geothermal water has a property capable of suppressing the deposition of scale, and power generation is continued (S6). The control device 3 finishes the control without sending a command to the chemical injection pump (END).

On the other hand, in the step (d), in a case in which the estimated pH value is lower than 8, it is determined that the alkaline chemical needs to be injected into the geothermal fluid, and the silica scale deposition control method further includes the following steps (e) to (j):

(e) determining the amount of the alkaline chemical to be injected, in a case in which it is determined that the alkaline chemical needs to be injected, in the step (d);

(f) injecting the alkaline chemical into the geothermal fluid, on the basis of the determination result of the step (e);

(g) measuring the temperature of the geothermal fluid at the pH estimation point after the step (f) has been completed;

(h) extracting a part of the hot water separated by the steam separator, after the step (f) has been completed, dissipating heat of the hot water, and measuring pH and temperature;

(i) estimating the pH of the geothermal fluid at the pH estimation point, on the basis of the measurement results of the steps (g) and (h); and (j) determining whether the amount of the alkaline chemical to be injected into the geothermal fluid is increased, decreased, or maintained, on the basis of the estimation result of the step (i).

In the step (e), the amount of alkaline chemical to be injected is determined. As the alkaline chemical, sodium hydroxide, potassium hydroxide, sodium hydrogen carbonate or the like can be used, but the alkaline chemical is not limited to a particular chemical. The amount of the alkaline chemical to be injected can be calculated so that a target pH value of the hot water after the injection will be 8 or higher and 9 or lower, on the basis of the estimated pH value obtained in the step (c) and a flow quantity of the hot water in the design specification, which is particular to the geothermal power generation system, at the pH estimation point. The calculation can be performed by an algorithm which has been pre-installed in the control device 3. The step (e) corresponds to S7 in the flowchart.

In the step (f), an alkaline chemical is injected into the geothermal fluid, on the basis of the determination result of the step (e). The alkaline chemical can be injected by the chemical injection pump 2 which has been operated by the control device 3. The step (f) corresponds to S8 and S9 in the flowchart.

In the step (g), a temperature at the pH estimation point is obtained again in order to obtain an estimated pH value, after the step (f) has been completed. The operation may be the same as in the step (a). In addition, the step (h) is a step of obtaining the pH and the temperature at the pH measurement point again in order to obtain the estimated pH value, after the step (f) has been completed. The operation is the same as in the step (b), and is an operation of extracting a part of the hot water separated in the steam separator, dissipating the heat, and measuring the pH and the temperature. The step (g) corresponds to S10 in the flowchart, and the step (h) corresponds to S11 and S12.

In the step (i), the pH of the geothermal fluid at the pH estimation point is estimated according to the measurement results of the steps (g) and (h). The step (i) corresponds to the S13 in the flowchart, and the estimated pH value after the alkaline chemical has been injected can be obtained.

In the step (j), it is determined whether the amount of the alkaline chemical to be injected into the geothermal fluid is increased, decreased, or maintained, on the basis of the estimation result of the step (i). In the present step, the estimated pH value are divided into three cases: a case in which the value is lower than a predetermined range in the alkaline range (specifically, lower than 8), a case in which the value is within the predetermined range of the alkaline range (specifically, 8 or higher and 9 or lower), and a case in which the value exceeds the predetermined range of the alkaline range (specifically, in the case in which the value is higher than 9), and the controls are performed for the respective cases. After the S13 in FIG. 2A, the flowchart proceeds to A of the flowchart of FIG. 2B. The step (j) corresponds to S14 in the flowchart of FIG. 2B. In the case in which the estimated pH value is 8 or higher and 9 or lower, it is determined that the geothermal water is in a state in which the deposition of the scale can be suppressed, proceeding to S15 to continue the power generation. The control device 3 finishes the control without sending an additional command to the chemical injection pump 2 (END). Accordingly, the injection of the chemical is continued by the amount determined in the step (e), and the power generation is continued.

Next, in the step (j), in a case in which the estimated pH value is lower than the predetermined preferable range, for example, lower than 8, it is determined to increase the amount of the alkaline chemical to be injected, and the silica scale deposition control method further includes the following steps:

(k) determining an amount of the alkaline chemical to be injected after increase;

(l) injecting the alkaline chemical into the geothermal fluid, on the basis of the determination result of the step (k);

(m) measuring the temperature of the geothermal fluid at the pH estimation point, after the step (l) has been completed;

(n) extracting a part of the hot water separated by the steam separator, dissipating heat of the hot water, and measuring the pH and the temperature thereof, after the step (l) has been completed; and (o) estimating the pH of the geothermal fluid at the pH estimation point, on the basis of the measurement results of the steps (m) and (n).

The operations including these steps (k) to (o) can be referred to as operations of increasing and estimating the pH.

The steps (k) and (l) are performed in the case in which the estimated pH value is lower than 8, in other words, in the case in which the amount of the alkaline chemical to be injected, which has been determined in the step (e), has not been sufficient to raise the pH value at the pH estimation point. In the case in which the estimated pH value is lower than 8 in S14, the process proceeds to S21.

In the step (k), an amount of the alkaline chemical to be injected after increase is determined. In the case in which the estimated pH value is lower than 8, it is assumed that an actual flow quantity of the hot water at the pH estimation point is greater than the flow quantity of the hot water in the design specification at the pH estimation point, which has been used for the calculation in the step (e). Accordingly, the actual flow quantity of the hot water at the pH estimation point is calculated, from the amount of the alkaline chemical to be injected, which has been determined in the step (e), and the estimated pH value obtained in the step (j). The calculation can be performed by an algorithm which has been pre-installed in the control device 3. In addition, the amount of the alkaline chemical to be injected after increase can be determined from the actual flow quantity of the hot water at the pH estimation point, which has been obtained by the calculation. The step (k) corresponds to S21 and S22 in the flowchart.

In a subsequent step (l), the alkaline chemical is injected into the geothermal fluid on the basis of the determination result of the step (k). The step (l) corresponds to S23 in the flowchart.

In the step (m), a temperature at the pH estimation point is obtained again in order to obtain an estimated pH value, after the step (l) has been completed. The operation may be the same as in the step (a). In addition, in the step (n), the pH and the temperature at the pH measurement point are obtained again, in order to obtain the estimated pH value, after the step (l) has been completed. The operation is the same as in the step (b), and is an operation of extracting a part of the hot water separated by the steam separator 6, dissipating the heat, and measuring the pH and the temperature. The step (m) corresponds to S24 in the flowchart, and the step (n) corresponds to S25 and S26.

In the step (o), the pH of the geothermal fluid at the pH estimation point is estimated according to the measurement results of the steps (m) and (n). The step (o) corresponds to S27 in the flowchart. Due to these operations of increasing and estimating the pH, the estimated pH value after the amount of the alkaline chemical to be injected has been increased for the purpose of increasing the pH can be obtained.

In contrast, in the case in which the estimated pH value is higher than the predetermined preferable range, for example, higher than 9, it is determined to decrease the amount of the alkaline chemical to be injected, and the silica scale deposition control method further includes the following steps:

(p) determining the amount of the alkaline chemical to be injected after decrease;

(q) injecting the alkaline chemical into the geothermal fluid, on the basis of the determination result of the step (p);

(r) measuring the temperature of the geothermal fluid at the pH estimation point, after the step (q) has been completed;

(s) extracting a part of the hot water separated by the steam separator, dissipating heat of the hot water, and measuring the pH and the temperature thereof, after the step (q) has been completed; and (t) estimating the pH of the geothermal fluid at the pH estimation point, on the basis of the measurement results of the steps (r) and (s).

The operations including these steps (p) to (t) can be referred to as operations of decreasing and estimating the pH.

The steps (p) to (t) are performed in a case in which the estimated pH value in the S14 exceeds 9, in other words, in the case in which the amount of alkaline chemical to be injected, which has been determined in the step (e), has exceeded the appropriate range and raised the pH of the hot water. In the case in which the estimated pH value exceeds 9 in S14, the process proceeds to S31.

In the step (p), an amount of the alkaline chemical to be injected after decrease is determined. In the case in which the estimated pH value exceeds 9, it is assumed that an actual flow quantity of the hot water at the pH estimation point is less than the flow quantity of the hot water in the design specification at the pH estimation point, which has been used for the calculation in the step (e). Accordingly, the actual flow quantity of the hot water at the pH estimation point is calculated, from the amount of the alkaline chemical to be injected, which has been determined in the step (e), and the estimated pH value obtained in the step (j). The calculation can be performed by an algorithm which has been pre-installed in the control device 3. In addition, the amount of the alkaline chemical to be injected after decrease can be determined from the actual flow quantity of the hot water at the pH estimation point, which has been obtained by the calculation. The step (p) corresponds to S31 and S32 in the flowchart.

In the subsequent step (q), the alkaline chemical is injected into the geothermal fluid, on the basis of the determination result of the step (p). The step (q) corresponds to S33 in the flowchart.

In the step (r), a temperature at the pH estimation point is obtained again in order to obtain an estimated pH value, after the step (q) has been completed. The operation may be the same as in the step (a). In addition, the step (p) is a step of obtaining the pH and the temperature at the pH measurement point again, in order to obtain the estimated pH value, after the step (q) has been completed. The operation is the same as in the step (b), and is an operation of extracting a part of the hot water separated by the steam separator 6, dissipating the heat, and measuring the pH and the temperature. The step (r) corresponds to S34 in the flowchart, and the step(s) corresponds to S35 and S36.

In the step (t), the pH of the geothermal fluid at the pH estimation point is estimated according to the measurement results of the steps (r) and(s). The step (t) corresponds to S37 in the flowchart. Due to these operations of decreasing and estimating the pH, the estimated pH value after the amount of the alkaline chemical to be injected has been decreased for the purpose of decreasing the pH can be obtained.

When the estimated pH value after the amount of the alkaline chemical to be injected has been increased or decreased is obtained in S27 or S37 in the flowchart, the process returns to S14, and the next step is determined according to a determination expression. To be specific, in the case in which the pH is lower than 8, the operations of increasing and estimating the pH (steps (k) to (o), S21 to S27) are performed, and in the case in which the pH is higher than 9, the operations of decreasing and estimating the pH (steps (p) to (t), S31 to S37) are performed. In the case in which the pH is 8 or higher and 9 or lower, the process proceeds to S15, and completes the control. It is preferable to repeat these operations until the estimated pH value falls within a predetermined preferable range, for example, in the case of FIG. 2B, until the estimated pH value becomes 8 or higher and 9 or lower.

In this way, due to the pH of the geothermal fluid flowing through the geothermal power generation system being controlled so as to be within a range of a predetermined value at the predetermined pH estimation point, it is possible to prevent the geothermal fluid from having a property of easily forming scale, and to control the deposition of silica scale.

According to the geothermal power generation system of the first embodiment, the estimated pH value is obtained between the production well 5 and the steam separator 6, and the alkaline chemical is injected into the geothermal fluid between the production well 5 and the steam separator 6, and thereby, the pH of the geothermal fluid can be controlled, and the adhesion of scale can be suppressed.

Figure 3:
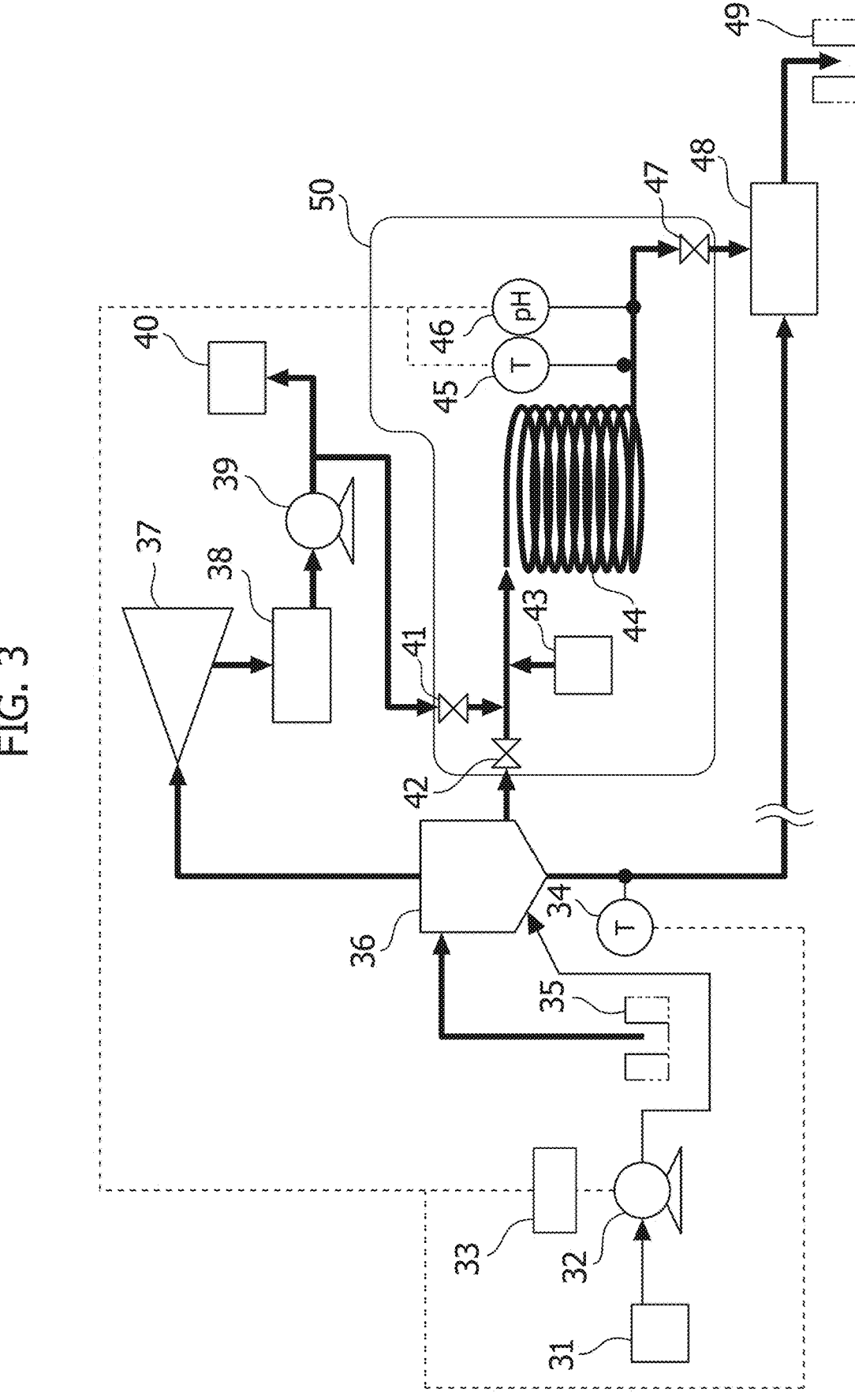
FIG. 3 is a view conceptually showing a geothermal power generation system according to a second embodiment of the present invention.

Next, FIG. 3 is a view conceptually showing a geothermal power generation system according to a second embodiment of the present invention. The geothermal power generation system shown in FIG. 3 is different from the first embodiment in that a second thermometer 34 is provided at the outlet of the hot water of a steam separator 36 and that a chemical injection pump 32 is configured to inject a chemical into the hot water portion in steam separator 36. The other configurations are the same as those of the first embodiment. In addition, the steps of silica scale deposition control method are also the same as those of the first embodiment. The hot water portion in steam separator 36 is a portion through which hot water flows, which has been obtained after steam has been separated from the geothermal fluid flowing into steam separator 36.

According to the geothermal power generation system of the second embodiment of the present invention, the alkaline chemical is injected into the hot water portion in steam separator 36; and thereby, there is no risk of lowering the temperature of the geothermal steam to be used in the turbine, and heat loss can be prevented as compared with the case of the first embodiment.

Figure 4:
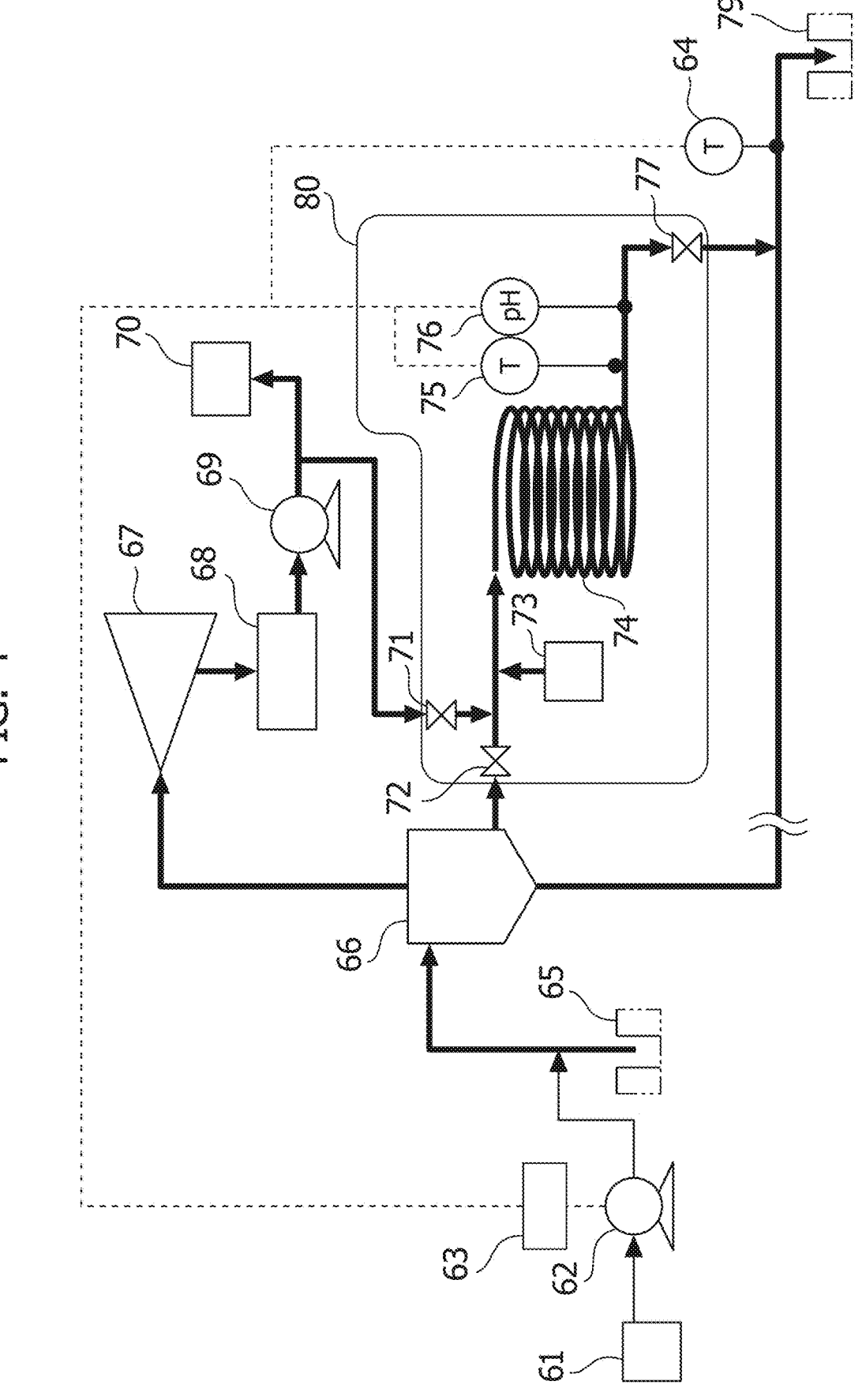
FIG. 4 is a view conceptually showing a geothermal power generation system according to a third embodiment of the present invention.

Next, FIG. 4 is a view conceptually showing a geothermal power generation system according to a third embodiment of the present invention. The geothermal power generation system shown in FIG. 4 is different from the first embodiment in that a second thermometer 64 is provided at an inlet of a reinjection well 79 and a hot water pit is not provided. The other configurations are the same as those of the first embodiment. In addition, the steps of the silica scale deposition control method are also the same as those of the first embodiment.

According to the geothermal power generation system of the third embodiment of the present invention, the inlet of reinjection well 79 is set as the pH estimation point, and the temperature of the hot water which enters reinjection well 79 is set as a parameter for determining the amount of the alkaline chemical to be injected. Thereby, it becomes possible to prevent formation of scale in a pipe leading to reinjection well 79. Because of this, a scale precipitation step in the hot water pit becomes unnecessary, which has been conventionally essential, and there is an advantage in that it is no longer necessary to provide the hot water pit.

REFERENCE SYMBOL LIST

1, 31, 61 Chemical tank
2, 32, 62 Chemical injection pump
3, 33, 63 Control device
4, 34, 64 Second thermometer
5, 35, 65 Production well
6, 36, 66 Steam separator
7, 37, 67 Turbine
8, 38, 68 Condenser
9, 39, 69 Condensate pump
10, 40, 70 Cooling tower
11, 41, 71 Second on-off valve
12, 42, 72 First on-off valve
13, 43, 73 Cleaning chemicals injection device
14, 44, 74 Spiral pipe
15, 45, 75 First thermometer
16, 46, 76 pH meter
17, 47, 77 Third on-off valve
18, 48 Hot water pit
19, 49, 79 Reinjection well

The invention claimed is:
1. A geothermal power generation system comprising:
   a steam separator configured to separate a geothermal fluid which is obtained from a production well, into steam and hot water;
   a turbine that is configured to be rotated by the steam separated by the steam separator;

a reinjection well configured such that the geothermal fluid that has passed through the steam separator and/or the turbine is returned;

a pH measurement system configured to extract a part of the hot water separated by the steam separator and measure a pH of the hot water, and a first thermometer configured to measure a temperature of the hot water;

an injection device configured to inject an alkaline chemical into the geothermal fluid;

a second thermometer configured to measure a temperature of the geothermal fluid at a pH estimation point selected from a group of sites in the system including an injection portion of the injection device for the alkaline chemical, an outlet of the steam separator, and an inlet of the reinjection well; and a control device configured to control injection of the alkaline chemical by the injection device, on basis of measurement results of the pH measurement system, the first thermometer and the second thermometer, wherein the pH measurement system includes a spiral pipe and a pH meter, and is connected to a condensate pump downstream of the turbine via an on-off valve.

2. The system according to claim 1, wherein the pH measurement system further comprises an injection portion for cleaning chemicals.

3. The system according to claim 1, wherein the injection device is connected to a hot water portion of the steam separator.

4. The system according to claim 1, wherein the injection device is connected to a pipe between the production well and the steam separator.

5. The system according to claim 4, wherein the second thermometer is provided in the pipe between the production well and the steam separator.

6. The system according to claim 4, wherein the second thermometer is provided at the inlet of the reinjection well.

7. A method of controlling silica scale deposition using the geothermal power generation system of claim 1, comprising:

(a) measuring a temperature of the geothermal fluid at the pH estimation point of the geothermal power generation system;

(b) extracting a part of hot water separated by the steam separator, dissipating heat of the hot water, and measuring a pH and a temperature thereof;

(c) estimating the pH of the geothermal fluid at the pH estimation point, on basis of measurement results of the steps (a) and (b); and (d) determining whether or not the alkaline chemical needs to be injected into the geothermal fluid, on basis of an estimation result of the step (c).

8. The method according to claim 7, wherein in the step (d), in a case in which the pH is lower than a predetermined range in an alkaline range, it is determined that the alkaline chemical needs to be injected into the geothermal fluid.

9. The method according to claim 8, further comprising:

(e) determining an amount of the alkaline chemical to be injected, in a case in which it is determined that the alkaline chemical needs to be injected, in the step (d);

(f) injecting the alkaline chemical into the geothermal fluid, on basis of a determination result of the step (e);

(g) measuring a temperature of the geothermal fluid at the pH estimation point, after the step (f) has been completed:

(h) extracting a part of the hot water separated by the steam separator, after the step (f) has been completed, dissipating heat of the hot water, and measuring the pH and the temperature of the hot water;

(i) estimating the pH of the geothermal fluid at the pH estimation point, on basis of measurement results of the steps (g) and (h); and (j) determining whether the amount of the alkaline chemical to be injected into the geothermal fluid is increased, decreased, or maintained, on basis of an estimation result of the step (i).

10. The method according to claim 9, wherein, in the step (j):

it is determined to increase an amount of the alkaline chemical to be injected, in a case in which the pH is lower than the predetermined range in the alkaline range;

it is determined to decrease the amount of the alkaline chemical to be injected, in a case in which the pH is higher than the predetermined range in the alkaline range; and it is determined to maintain the amount of the alkaline chemical to be injected, in a case in which the pH is within the predetermined range of the alkaline range.

11. The method according to claim 10, comprising:

in a case in which it is determined to increase the amount of the alkaline chemical to be injected, in the step (j), performing operations of increasing and estimating the pH, which comprise (k) determining an amount of the alkaline chemical to be injected after increase, (l) injecting the alkaline chemical into the geothermal fluid, on basis of a determination result of the step (k), (m) measuring the temperature of the geothermal fluid at the pH estimation point, after the step (l) has been completed, (n) extracting a part of the hot water separated by the steam separator, dissipating heat of the hot water, and measuring the pH and the temperature of the hot water, after the step (l) has been completed, and (o) estimating the pH of the geothermal fluid at the pH estimation point, on basis of measurement results of the steps (m) and (n); and in a case in which it is determined to decrease the amount of the alkaline chemical to be injected, in the step (j), performing the operations of decreasing and estimating the pH, which comprise (p) determining the amount of the alkaline chemical to be injected after decrease, (q) injecting the alkaline chemical into the geothermal fluid, on basis of a determination result of the step (p), (r) measuring the temperature of the geothermal fluid at the pH estimation point, after the step (q) has been completed, (s) extracting a part of the hot water separated by the steam separator, dissipating heat of the hot water, and measuring the pH and the temperature of the hot water, after the step (q) has been completed, and (t) estimating the pH of the geothermal fluid at the pH estimation point, on basis of measurement results of the steps (r) and(s).

12. The method according to claim 11, further comprising:

determining whether the amount of the alkaline chemical to be injected into the geothermal fluid is increased, decreased, or maintained, on basis of estimation results of the step (o) or the step (t); and repeating the operations of increasing and estimating the pH or the operations of decreasing and estimating the pH, until the pH estimated reaches a predetermined range in a predetermined alkaline range.

\* \* \* \* \*